(12) United States Patent
Gräber et al.

(10) Patent No.: US 7,305,864 B2
(45) Date of Patent: Dec. 11, 2007

(54) BALL AND SOCKET JOINT FOR A MOTOR VEHICLE

(75) Inventors: Jürgen Gräber, Stemwede-Dielingen (DE); Joachim Spratte, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/595,531

(22) PCT Filed: Oct. 1, 2004

(86) PCT No.: PCT/DE2004/002190

§ 371 (c)(1),
(2), (4) Date: Apr. 26, 2006

(87) PCT Pub. No.: WO2005/045265

PCT Pub. Date: May 19, 2005

(65) Prior Publication Data

US 2007/0051171 A1    Mar. 8, 2007

(30) Foreign Application Priority Data

Oct. 29, 2003  (DE) .............................. 103 50 640

(51) Int. Cl.
*G01M 17/06* (2006.01)
(52) U.S. Cl. ..................... 73/11.04; 73/118.1
(58) Field of Classification Search ................. 73/1.79, 73/11.04, 11.07, 118.1
See application file for complete search history.

(56) References Cited

U.S. PATENT DOCUMENTS

| 5,579,228 | A | * | 11/1996 | Kimbrough et al. | .......... 701/41 |
| 5,712,478 | A | * | 1/1998 | Olsson | .................. 250/231.13 |
| 6,252,394 | B1 | * | 6/2001 | Roze et al. | ............ 324/207.12 |
| 6,688,165 | B2 | * | 2/2004 | Heidemann | ................ 73/118.1 |
| 6,879,240 | B2 | * | 4/2005 | Kruse | .......................... 338/12 |
| 7,063,480 | B2 | * | 6/2006 | Ersoy et al. | ................ 403/132 |
| 2003/0070476 | A1 | * | 4/2003 | Heidemann | ................ 73/118.1 |
| 2004/0100357 | A1 | * | 5/2004 | Kruse | ........................ 338/128 |
| 2006/0078369 | A1 | * | 4/2006 | Spratte | ....................... 403/122 |
| 2006/0228167 | A1 | * | 10/2006 | Spratte et al. | ............. 403/122 |

FOREIGN PATENT DOCUMENTS

| DE | 10110738 C1 | 11/2002 |
| EP | 0617260 A1 | 9/1994 |

\* cited by examiner

*Primary Examiner*—Eric S. McCall
(74) *Attorney, Agent, or Firm*—McGlew and Tuttle, P.C.

(57) ABSTRACT

A ball joint for a motor vehicle includes a housing (6) having a cavity (5), and with a ball pivot (1), which has a pin (2) and a joint ball (3) and which, with its joint ball (3), is mounted in the cavity (5) of the housing (6) in a manner that permits it to rotate and pivot. The journal (2) extends through an opening (7) provided in the housing and out therefrom. The inventive ball joint also comprises sealing bellows (11), which are placed between the housing (6) and the journal (2). A multipart measuring arrangement is provided having at least one signal transmitter (17, 18) and at least one sensor (20, 21, 22). The measuring arrangement is placed between the pin-side end of the joint ball (3) and the pin-side end of the sealing bellows (11).

22 Claims, 3 Drawing Sheets

BALL AND SOCKET JOINT FOR A MOTOR VEHICLE

CROSS REFERENCE TO RELATED APPLICATIONS

This application is a United States National Phase application of International Application PCT/DE2004/002190 filed Oct. 1, 2004 and claims the benefit of priority under 35 U.S.C. 119 of German Patent Application DE 10350640 filed Oct. 29, 2003, the entire contents of which are incorporated herein by reference.

FIELD OF THE INVENTION

The present invention pertains to a ball and socket joint for a motor vehicle, with a housing having a recess, a ball pivot which has a pin and a joint ball which is mounted with its joint ball rotatably and pivotably in the recess of the housing, whereby the pin extends out through an opening provided in the housing, a sealing bellows arranged between the housing and the pin and with a multipart measuring array, which has at least one signal transmitter and at least one sensor.

BACKGROUND OF THE INVENTION

Chassis data regarding steering angle as well as load state and spring deflection state are currently determined by means of suitable sensors in the vehicle to supply data for electronic systems. These are used for the electronic stability programs or, e.g., for headlight leveling control. These sensors are frequently coupled, as separate structural components, to the connecting rods of the chassis via mechanisms. Furthermore, an effort is made to integrate these sensors in ball and socket joints of the connecting rods, so that the joint itself is part of a sensor array.

A ball and socket joint with a ball socket connected to a housing and a ball connected to a pin that is rotatably mounted in the housing has become known from EP 0 617 260 A1. A permanent magnet, opposite which lies a magnetic sensing element arranged in the housing, is arranged in the ball end. The magnetic dipole of the permanent magnet is aligned at right angles to the longitudinal axis of the ball pivot, whereby a bellows is provided for the protection of the ball joint against the effects of the environment. By means of a rotation of the ball end in the ball socket, the permanent magnet is also rotated, such that the magnetic field in relation to the magnetic-field-sensitive sensing element changes and a position signal is generated. Additionally occurring three-dimensional movements may be considered in corresponding evaluation for control purposes.

A ball and socket joint with a housing section and a ball pin having a pin section and a ball section, which is mounted rotatably and pivotably, with its ball section, in a mount provided in the housing section, is known from DE 101 10 738 C1. In the ball section there is arranged a permanent magnet in radial alignment with the central point of the ball section, whereby a magnetic-field-sensitive sensor element is integrated into the mount. With a rotating movement of the ball section, the permanent magnet is moved in relation to the sensor element, so that the relative rotational position of the ball section in the mount can be determined.

Such ball and socket joints have the drawback that the tribological properties of the ball and socket joint may be affected negatively by the arrangement of magnet and magnetic-field-sensitive sensing element in the mounting area of the joint ball.

SUMMARY OF THE INVENTION

The object of the present invention is to provide a ball and socket joint, in which this negative effect on the tribological properties cannot occur.

This object is accomplished according to the present invention by a ball and socket joint having for a motor vehicle according to the present invention having a housing which is provided with a recess, a ball pivot which has a pin and a joint ball, which is mounted rotatably and pivotably, with its joint ball, in the recess of the housing, whereby the pin extends through an opening provided in the housing out of this housing. A sealing bellows is arranged between the housing and the pin. A multipart measuring array with at least one signal transmitter and at least one sensor is arranged between the pin-side end of the joint ball and the pin-side end of the sealing bellows.

In the ball and socket joint according to the present invention, the measuring array is arranged completely outside of the mounting area for the joint ball, such that the measuring array cannot lead to any negative effect on the tribological behavior of the ball and socket joint. Moreover, the measuring array can be protected by the sealing bellows against environmental effects, such as dirt and water.

Furthermore, by providing the measuring array in the so-called "neck area" of the joint according to the present invention, compared to the state of the art, there are no restrictions on the measurement of the pivoting and/or rotation of the ball pivot against the housing. Therefore, it is possible with a ball and socket joint according to the present invention to measure the pivoting and/or rotation of the ball pivot against the housing according to all three degrees of freedom of the joint.

In the ball and socket joint according to the present invention, the signal transmitter and sensor each form a part of the measuring array, whereby preferably one part of the measuring array is arranged at the pin and another part of the measuring array is arranged at the housing for determining the pivoting and/or the rotation of the ball pivot against the housing. The edge area of the housing that surrounds the opening is especially suitable for fastening the sensor or the signal transmitter.

For the simultaneous measurement of the pivoting and rotation of the ball pivot, it has proven to be advantageous if the signal transmitter produces a dipole field. Based on the alignment and intensity of this dipole field, the pivoting and/or rotation of the ball pivot can be detected simply by means of one or more sensors. An electrical field may be selected as the dipole field; however, a magnetic field as a dipole field is preferred because of the interference immunity of magnetic fields, whereby the signal transmitter is embodied as a magnet and the sensor is embodied as a magnetic-field-sensitive sensor. All the usual magnetic sensors are suitable for the magnetic-field-sensitive sensor, whereby, e.g., a Hall sensor or a magnetoresistive sensor may be used depending on the application.

The ball and socket joint according to the present invention is not limited to a measurement of magnetic or electrical fields, however, such that audio or visual (e.g., ultrasound) measurements, which can be considered for the determination of the pivoting or rotation of the ball pivot, e.g., by the determination of reflection changes (intensity) or of interferences on aligned, flat surfaces, are also applicable. Induction methods or transit time measurements as well as combinations of the above-mentioned measurement methods can also be used.

If a magnetic signal transmitter is used, it may be embodied as a permanent magnet. However, it is also especially possible to embody the signal transmitter as an electromagnet, whereby a signal may be superimposed on the current causing the magnetic field or the current causing the magnetic field to be modulated. The modulation of the magnetic field resulting from this makes it possible to use additional effects in the measurement.

A single sensor may be sufficient for measuring the pivoting and/or rotation of the ball pivot in case of small angles of rotation. However, in the case of larger angles of rotation, providing a plurality of sensors or a plurality of signal transmitters is meaningful, whereby good results can be achieved already with two sensors. The distinction between tilting motion and rotating motion can be calculated from the individual signals of the sensors, which are preferably arranged on a circle.

The higher the number of the sensors is, the higher is the achievable resolution in the measurement, whereby it is possible to integrate a plurality of individual sensors as so-called sensor arrays in a single component. These individual sensors can then also supply vectorial measured variables, which are advantageous for the calculation of the alignment of the dipole field.

Preferably, the measuring array has signal transmitters and three sensors, with which larger angles of rotation of, e.g., more than 90° can be detected without problems. It proved to be advantageous if the two signal transmitters are arranged diametrically opposite one another at the pin and the sensors, forming the corner points of a triangle, are arranged at the edge area of the housing which surrounds the opening.

With the use of a plurality of signal transmitters and a plurality of sensors, it is possible to prevent the sensors from supplying unclear data in the case of superimposed rotating and tilting motions. If three sensors are used, dead centers may even be extensively ruled out in the measurement.

If two signal transmitters are embodied as magnets which are arranged diametrically opposite each other at the pin, the north pole of the first magnet is especially opposite the south pole of the second magnet and the north pole of the second magnet is opposite the south pole of the first magnet. The resulting magnetization of each magnet may, furthermore, lie on a plane that runs at right angles to the central longitudinal axis of the ball pivot. The sensors arranged preferably on the edge area of the housing that surrounds the opening are especially embodied as magnetic-field-sensitive sensors.

Instead of dipole fields, quadrupole fields or other fields of varying geometry may be used, whereby these fields may be, e.g., magnetic fields that are produced by a magnetized ring with corresponding poles, which is mounted at the pin.

The present invention is described below based on a preferred embodiment with reference to the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
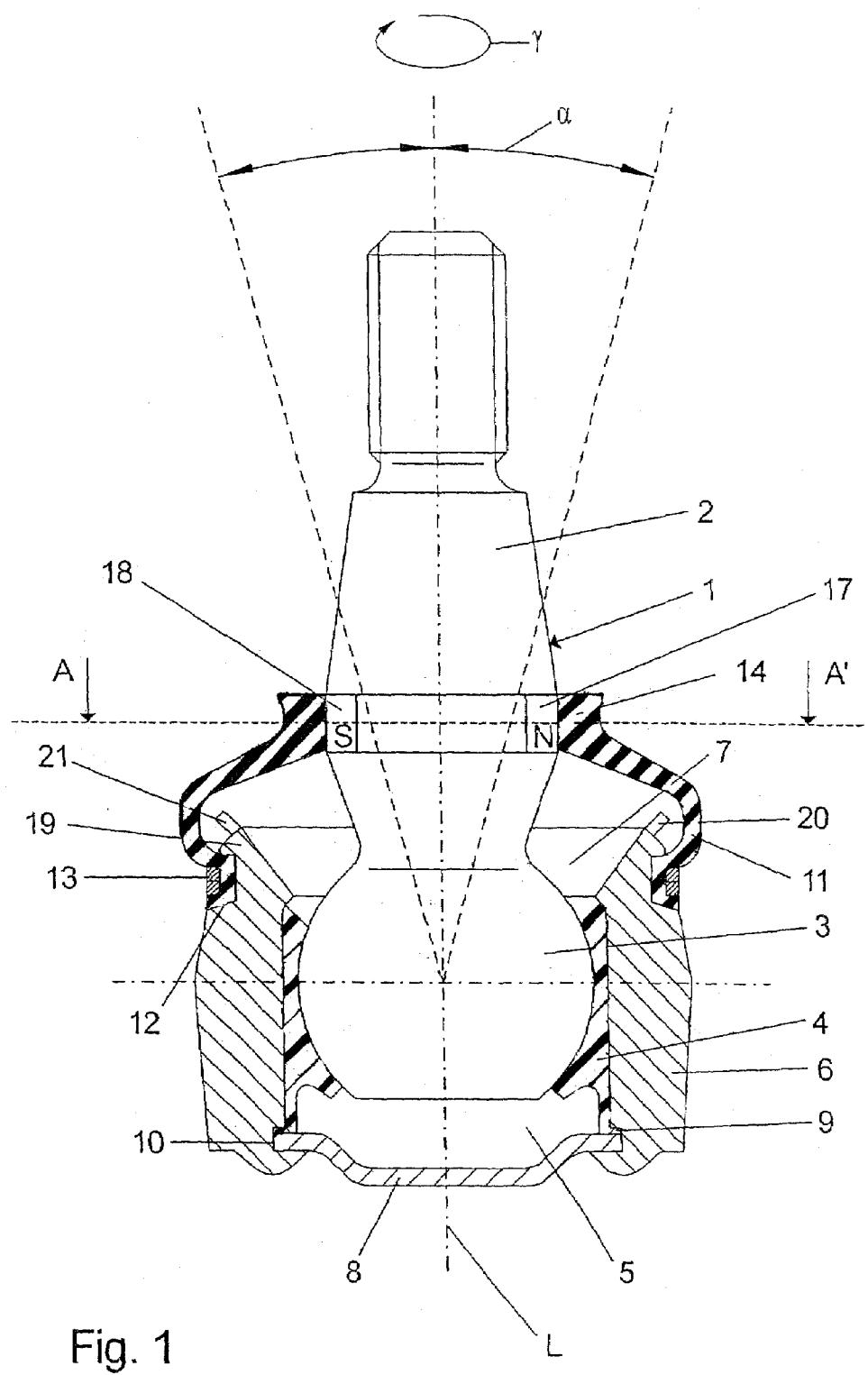
FIG. 1 is a sectional view of an embodiment of the ball and socket joint according to the present invention.

Referring to the drawings in particular, FIG. 1 shows an embodiment of the ball and socket joint according to the present invention, in which a ball pivot 1 with a pin 2 and a joint ball 3 is rotatably and pivotably mounted in a recess 5 in a housing 6 through the intermediary of a bearing shell 4. The ball pivot 1 extends, with its pin 2, through an opening 7 provided in the housing 6 out of this housing 6, whereby the housing 6 is closed via a cover 8 at one end opposite the opening 7. The cover 8 meshes, together with a radial projection 9 of the bearing shell 4, with an annular groove 10 provided in the housing 6, such that the cover 8 and the bearing shell 4 are fixed at the housing 6 in a positive-locking manner.

Between the housing 6 and the pin 2 is arranged a sealing bellows 11, which, with its housing-side end, is enclosed in a groove 12 provided in the housing 6 and is held via clamping rings 13. On its pin-side end, the sealing bellows 11 has a sealing area 14, which lies at the pin 2 of the ball pivot 1 in a sealing manner.

Two recesses 15 and 16 (see FIG. 2), in which magnets 17 and 18, respectively, are arranged, are provided in the pin 2. The magnets 17 and 18 are arranged diametrically opposite one another at the pin 2, whereby the north pole N of the magnet 17 is opposite the south pole S of the magnet 18 and the north pole N of the magnet 18 is opposite the south pole S of the magnet 17 (see FIG. 2). The magnets 17 and 18 are arranged at the level of the sealing area 14 at the pin 2, whereby the resulting magnetization in each of the magnets 17, 18 lies on a plane which runs at right angles to the central longitudinal axis L of the ball pivot.

Three sensors 20, 21 and 22 (see FIG. 2), which can detect the magnetic field originating at the magnets 17 and 18, are arranged lying on a circle at an edge area 19 of the housing which surrounds the opening 7. An evaluation by means of an electronic evaluating unit 25 of the signals detected by the sensors supplies the pivoting α and/or rotation γ of the ball pivot 1 in relation to the housing 6 (see FIG. 3).

Figure 2:
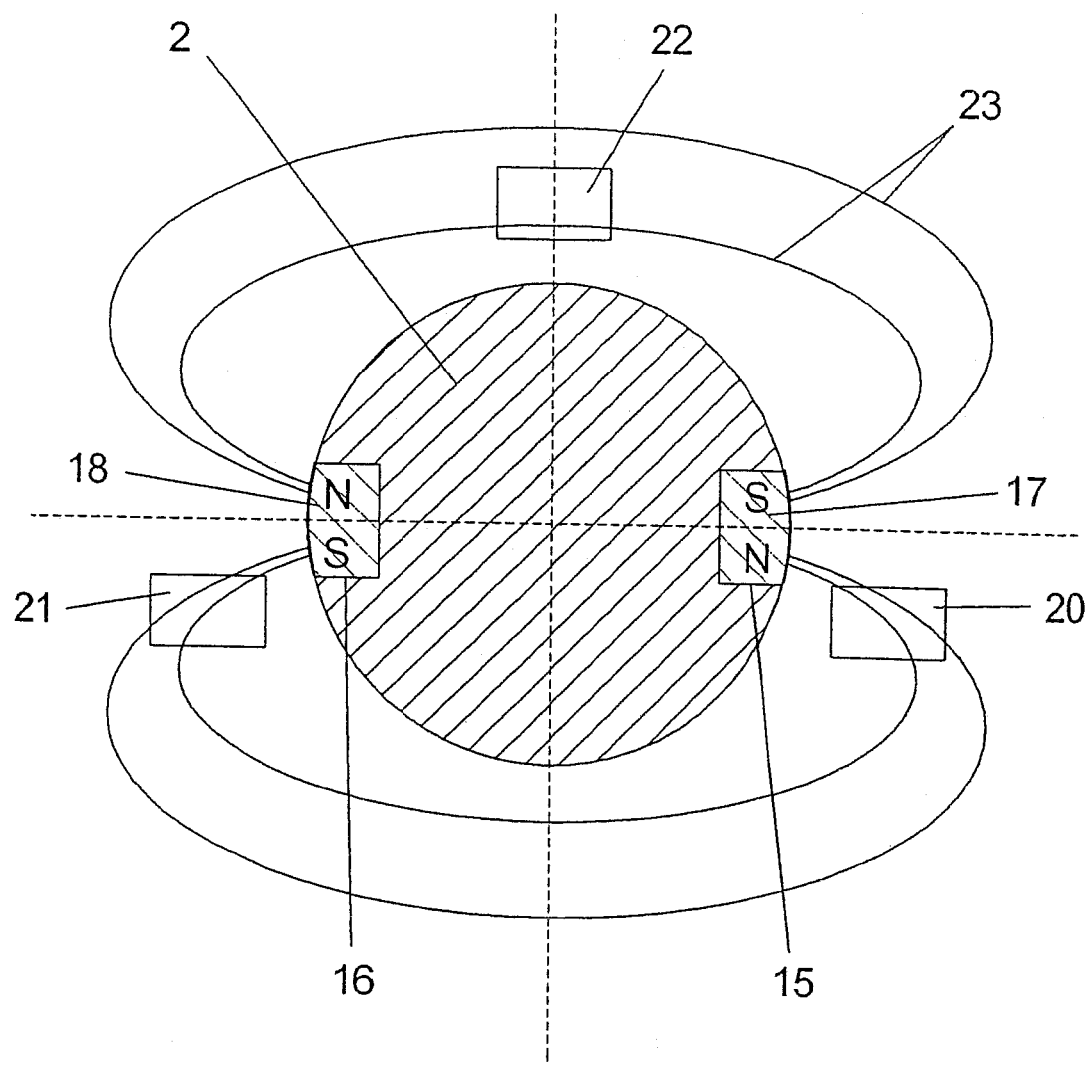
FIG. 2 is a schematic sectional view of the embodiment according to sectional line A-A' in FIG. 1.

FIG. 2 shows a top view of a section along the sectional line A-A' in FIG. 1, whereby, for the sake of clarity, only the cut pin 2 with the recesses 15 and 16 and the magnets 17 and 18, as well as the three magnetic-field-sensitive sensors 20, 21 and 22 are shown. The magnetic field pattern caused by the magnets 17 and 18 is indicated by means of the lines 23.

As FIG. 2 shows, the magnetic-field-sensitive sensors 20, 21 and 22 are arranged lying on the corner points of a triangle, whereby the two magnets 17 and 18 lie within the area of the triangle.

Figure 3:
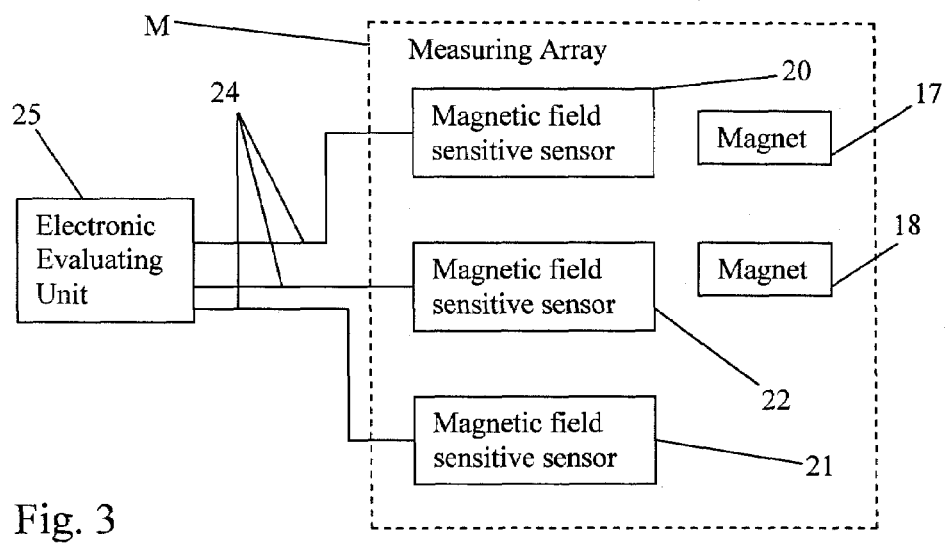
FIG. 3 is a schematic block diagram of the measuring array with evaluating unit.

FIG. 3 shows a schematic view of an electrical switching circuit, whereby the three sensors 20, 21 and 22 are connected to the electronic evaluating unit 25 via electrical lines 24. The sensors 20, 21, 22 and the signal transmitters 17, 18 form the parts of a multipart measuring array M, which is shown in dotted line.

The magnets 17 and 18 are embodied as permanent magnets in the embodiment shown in FIGS. 1 through 3.

Figure 4:
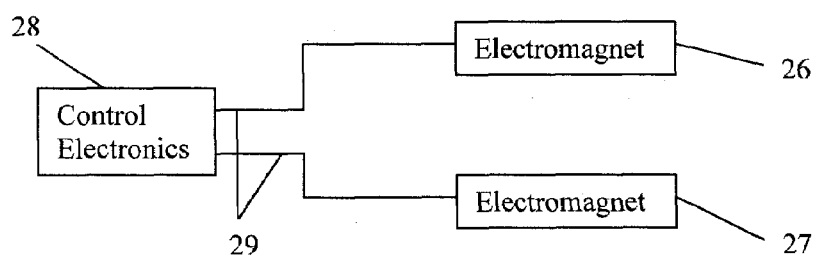
FIG. 4 is a schematic block diagram of a modified embodiment with electromagnets and control electronics.
Figure 5:
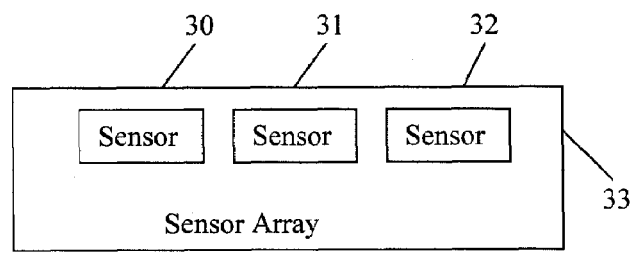
FIG. 5 is a schematic view of a sensor array.

According to a variant shown in FIG. 4, the magnets 17 and 18 may also, however, be embodied as electromagnets 26 and 27, which are supplied with current by a control electronics 28 via supply lines 29. The field-generating current may be superimposed by an additional signal.

The invention claimed is:

1. A ball and socket joint for a motor vehicle, the ball and socket joint comprising:
    a housing having a recess;
    a ball pivot which has a pin and a joint ball, which is mounted with said joint ball rotatably and pivotably in said recess of said housing, whereby said pin extends out through an opening provided in said housing;
    a sealing bellows arranged between said housing and said pin; and
    a multipart measuring array, which has at least one signal transmitter and at least one sensor, said measuring array being arranged between a pin-side end of said joint ball and a pin-side end of said sealing bellows, said signal transmitter comprising a magnet and said sensor comprising a magnetic-field-sensitive sensor.

2. A ball and socket joint in accordance with claim 1, wherein part of said measuring array is arranged at said pin and another part of said measuring array is arranged at said housing.

3. A ball and socket joint in accordance with claim 1, wherein a part of said measuring array is arranged at an edge area of said housing which surrounds said opening.

4. A ball and socket joint in accordance with claim 1, wherein said signal transmitter produces a dipole field.

5. A ball and socket joint in accordance with claim 1, wherein said signal transmitter comprises one of a permanent magnet and an electromagnet.

6. A ball and socket joint in accordance with claim 1, wherein said measuring array has a plurality of said signal transmitters and a plurality of said sensors.

7. A ball and socket joint in accordance with claim 1, wherein said measuring array has two said signal transmitters and three said sensors.

8. A ball and socket joint in accordance with claim 7, wherein the two said signal transmitters are arranged diametrically opposite one another at said pin and said sensors, forming the corner points of a triangle, are arranged at said edge area of said housing which surrounds said opening.

9. A motor vehicle ball and socket joint comprising:
    a housing having an opening to a recess;
    a ball pivot with a pin and a joint ball mounted in said recess of said housing whereby said pin extends out through said opening;
    a sealing bellows connected to said housing and said pin; and
    a multipart measuring array including signal transmitters mounted to one of said pin adjacent to said joint ball and said housing, adjacent to said sealing bellows, and sensors mounted to one of said pin, adjacent to said joint ball and said housing, adjacent to said sealing bellows, wherein said signal transmitters each comprise a magnet and said sensors each comprise a magnetic-field-sensitive sensor.

10. A motor vehicle ball and socket joint in accordance with claim 9, wherein said sensors are mounted at an edge area of said housing which surrounds said opening.

11. A motor vehicle ball and socket joint in accordance with claim 9, wherein said signal transmitters produce a dipole field.

12. A motor vehicle ball and socket joint in accordance with claim 9, wherein each of said signal transmitters comprises one of a permanent magnet and an electromagnet.

13. A motor vehicle ball and socket joint in accordance with claim 9, wherein said signal transmitters comprise two signal transmitters and said sensors comprise three sensors.

14. A motor vehicle ball and socket joint in accordance with claim 13, wherein said signal transmitters are arranged diametrically opposite one another at said pin and said sensors are arranged forming corner points of a triangle at an edge area of said housing which surrounds said opening.

15. A ball and socket joint for a motor vehicle, the ball and socket joint comprising:
    a housing having a recess;
    a ball pivot which has a pin and a joint ball, which is mounted with said joint ball rotatably and pivotably in said recess of said housing, whereby said pin extends out through an opening provided in said housing;
    a sealing bellows arranged between said housing and said pin; and
    a multipart measuring array, which has at least one signal transmitter and at least one sensor, said measuring array being arranged between a pin-side end of said joint ball and a pin-side end of said sealing bellows, said signal transmitter producing a dipole field.

16. A ball and socket joint for a motor vehicle, the ball and socket joint comprising:
    a housing having a recess;
    a ball pivot which has a pin and a joint ball, which is mounted with said joint ball rotatably and pivotably in said recess of said housing, whereby said pin extends out through an opening provided in said housing;
    a sealing bellows arranged between said housing and said pin; and
    a multipart measuring array having a plurality of signal transmitters and a plurality of sensors, said measuring array being arranged between a pin-side end of said joint ball and a pin-side end of said sealing bellows.

17. A ball and socket joint for a motor vehicle, the ball and socket joint comprising:
    a housing having a recess;
    a ball pivot which has a pin and a joint ball, which is mounted with said joint ball rotatably and pivotably in said recess of said housing, whereby said pin extends out through an opening provided in said housing;
    a sealing bellows arranged between said housing and said pin; and
    a multipart measuring array, said measuring array having two signal transmitters and three sensors, said measuring array being arranged between a pin-side end of said joint ball and a pin-side end of said sealing bellows.

18. A ball and socket joint for a motor vehicle, the ball and socket joint comprising:
    a housing having a recess;
    a ball pivot which has a pin and a joint ball, which is mounted with said joint ball rotatably and pivotably in said recess of said housing, whereby said pin extends out through an opening provided in said housing;
    a sealing bellows arranged between said housing and said pin; and
    a multipart measuring array, said measuring array having two signal transmitters and three sensors, said measuring array being arranged between a pin-side end of said joint ball and a pin-side end of said sealing bellows, wherein the two said signal transmitters are arranged diametrically opposite one another at said pin and said sensors, forming the corner points of a triangle, are arranged at said edge area of said housing which surrounds said opening.

19. A motor vehicle ball and socket joint comprising:
a housing having an opening to a recess;
a ball pivot with a pin and a joint ball mounted in said recess of said housing whereby said pin extends out through said opening;
a sealing bellows connected to said housing and said pin; and
a multipart measuring array including signal transmitters mounted to one of said pin adjacent to said joint ball and said housing, adjacent to said sealing bellows, and sensors mounted to one of said pin, adjacent to said joint ball and said housing, adjacent to said sealing bellows, said signal transmitters producing a dipole field.

20. A motor vehicle ball and socket joint comprising:
a housing having an opening to a recess;
a ball pivot with a pin and a joint ball mounted in said recess of said housing whereby said pin extends out through said opening;
a sealing bellows connected to said housing and said pin; and
a multipart measuring array including signal transmitters mounted to one of said pin adjacent to said joint ball and said housing, adjacent to said sealing bellows, and sensors mounted to one of said pin, adjacent to said joint ball and said housing, adjacent to said sealing bellows, each of said signal transmitters comprising one of a permanent magnet and an electromagnet.

21. A motor vehicle ball and socket joint comprising:
a housing having an opening to a recess;
a ball pivot with a pin and a joint ball mounted in said recess of said housing whereby said pin extends out through said opening;
a sealing bellows connected to said housing and said pin; and
a multipart measuring array including signal transmitters mounted to one of said pin adjacent to said joint ball and said housing, adjacent to said sealing bellows, and sensors mounted to one of said pin, adjacent to said joint ball and said housing, adjacent to said sealing bellows, said signal transmitters comprising two signal transmitters and said sensors comprising three sensors.

22. A motor vehicle ball and socket joint comprising:
a housing having an opening to a recess;
a ball pivot with a pin and a joint ball mounted in said recess of said housing whereby said pin extends out through said opening;
a sealing bellows connected to said housing and said pin; and
a multipart measuring array including signal transmitters mounted to one of said pin adjacent to said joint ball and said housing, adjacent to said sealing bellows, and sensors mounted to one of said pin, adjacent to said joint ball and said housing, adjacent to said sealing bellows, said signal transmitters comprising two signal transmitters and said sensors comprising three sensors, wherein said signal transmitters are arranged diametrically opposite one another at said pin and said sensors are arranged forming corner points of a triangle at an edge area of said housing which surrounds said opening.

* * * * *